US012057621B2

(12) United States Patent
Seo et al.

(10) Patent No.: US 12,057,621 B2
(45) Date of Patent: Aug. 6, 2024

(54) ELECTRONIC DEVICE AND METHOD FOR ANTENNA COUPLING

(71) Applicant: Samsung Electronics Co., Ltd., Gyeonggi-do (KR)

(72) Inventors: Pilwon Seo, Gyeonggi-do (KR); Bomi Lee, Gyeonggi-do (KR); Sangil Im, Gyeonggi-do (KR); Ilseub Kim, Gyeonggi-do (KR); Heedong Kim, Gyeonggi-do (KR); Yeonkwan Seo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 17/475,507

(22) Filed: Sep. 15, 2021

(65) Prior Publication Data

US 2022/0102839 A1 Mar. 31, 2022

Related U.S. Application Data

(63) Continuation of application No. PCT/KR2020/003557, filed on Mar. 13, 2020.

(30) Foreign Application Priority Data

Mar. 15, 2019 (KR) .................. 10-2019-0029690

(51) Int. Cl.
*H01Q 1/24* (2006.01)
*H01Q 1/48* (2006.01)
*H04B 1/00* (2006.01)

(52) U.S. Cl.
CPC ............... *H01Q 1/243* (2013.01); *H01Q 1/48* (2013.01); *H04B 1/0057* (2013.01)

(58) Field of Classification Search
CPC .................................. H01Q 1/48; H01Q 1/243
See application file for complete search history.

(56) References Cited

U.S. PATENT DOCUMENTS 8,723,735 B2  5/2014  Lee et al.
9,666,945 B2 *  5/2017  Kwak .................... H01Q 5/371
(Continued)

FOREIGN PATENT DOCUMENTS

EP   2339693 A1   6/2011
JP   6468817 B2   1/2019
(Continued)

OTHER PUBLICATIONS

Korean Notice of Patent Grant dated Aug. 22, 2023.
Korean Office Action dated Feb. 13, 2023.

*Primary Examiner* — Graham P Smith
(74) *Attorney, Agent, or Firm* — Cha & Reiter, LLC

(57) ABSTRACT

An electronic device and method are disclosed. The electronic device includes a first antenna configured to communicate using a first frequency band group, a ground switch coupled to the first antenna, a second antenna configured to communicate using a second frequency band group, wherein the second antenna overlaps the first antenna, a band selection switch configured to select one of multiple radio frequency (RF) paths for the second frequency band group, and a processor. The processor implements the method, including determining a communication frequency band, when the communication frequency band is unsupported by the second antenna, identifying an RF path corresponding to the communication frequency band from among the multiple RF paths, and controlling the band selection switch to select the identified RF path for operative connection to the second antenna.

20 Claims, 6 Drawing Sheets

(56) References Cited

U.S. PATENT DOCUMENTS

| | | | |
|---|---|---|---|
| 10,164,338 | B2 | 12/2018 | Ganchrow et al. |
| 2012/0319904 | A1 | 12/2012 | Lee et al. |
| 2015/0188212 | A1 | 7/2015 | Tseng et al. |
| 2017/0230075 | A1 | 8/2017 | Sun et al. |
| 2018/0131478 | A1 | 5/2018 | Song et al. |
| 2018/0198472 | A1 | 7/2018 | Lim |
| 2018/0367168 | A1 | 12/2018 | Lee et al. |
| 2020/0028241 | A1 | 1/2020 | Jung et al. |

FOREIGN PATENT DOCUMENTS

| | | |
|---|---|---|
| KR | 10-2012-0139090 A | 12/2012 |
| KR | 10-2018-0031120 A | 3/2018 |
| KR | 10-2018-0051156 A | 5/2018 |
| KR | 10-2018-0083219 A | 7/2018 |
| KR | 10-2018-0137765 A | 12/2018 |

* cited by examiner

ELECTRONIC DEVICE AND METHOD FOR ANTENNA COUPLING

CROSS-REFERENCE TO RELATED APPLICATION(S)

This application is a Continuation of International Application No. PCT/KR2020/003557, filed on Mar. 13, 2020, which claims priority to Korean Patent Application No. 10-2019-0029690 filed on Mar. 15, 2019 in the Korean Intellectual Property Office, the disclosures of which are herein incorporated by reference.

TECHNICAL FIELD

Certain embodiments to be described below relate to an electronic device for antenna coupling and an operation method thereof.

BACKGROUND ART

When a terminal communicates with a base station, the antenna has a major role in the ability to provide stable and continuous communication. In order to ensure sufficient performance of the antenna up to high-frequency bandwidths, a high-frequency bandwidth antenna may be included in the terminal.

DISCLOSURE

Technical Problem

The presence of a high-frequency band antenna may affect the performance of low and mid-frequency band antennas. Thus, it would be desirable and beneficial provide a scheme for mitigating the negative effect of the high-frequency band antenna on the low and mid-frequency band antennas.

The technical problems to be solved by the disclosure are not limited to the mentioned technical problem above, and other technical problems that are not mentioned may be clearly understood by those skilled in the art to which the disclosure belongs, from the description below.

Solution to Problem

An electronic device according to certain embodiments is disclosed, and may include a first antenna configured to communicate using a first frequency band group, a ground switch coupled to the first antenna, a second antenna configured to communicate using a second frequency band group, wherein the second antenna overlaps the first antenna, a band selection switch configured to select one of multiple radio frequency (RF) paths for the second frequency band group, a processor operatively connected to the first antenna, the ground switch, the second antenna, and the band selection switch, wherein the processor is configured to: determine a communication frequency band, when the communication frequency band is unsupported by the second antenna, identify an RF path corresponding to the communication frequency band from among the multiple RF paths, and control the band selection switch to select the identified RF path for operative connection to the second antenna.

According to certain embodiments, a method is disclosed of an electronic device including comprising a first antenna for a first frequency band group, a ground switch coupled to the first antenna, and a second antenna for a second frequency band group, the method including: determining, by at least one processor, a communication frequency band, when the determined communication frequency band is unsupported by the second antenna, identifying an radio frequency (RF) path corresponding to the determined communication frequency band from among multiple radio frequency (RF) paths for the second frequency band group, and controlling a band selection switch to select the identified RF path for operative connection to the second antenna.

Advantageous Effects of Invention

An electronic device and a method thereof according to certain embodiments can provide various impedance values through a band selection switch according to a communication frequency band, thereby overcoming the limitations produced in particular arrangements of high-frequency band antennas and low-frequency/mid-frequency band antennas.

Advantageous effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, certain embodiments of the disclosure will be described based on an approach of hardware. However, certain embodiments of the disclosure include a technology that uses both hardware and software, and thus the certain embodiments of the disclosure may not exclude the perspective of software.

Figure 1:
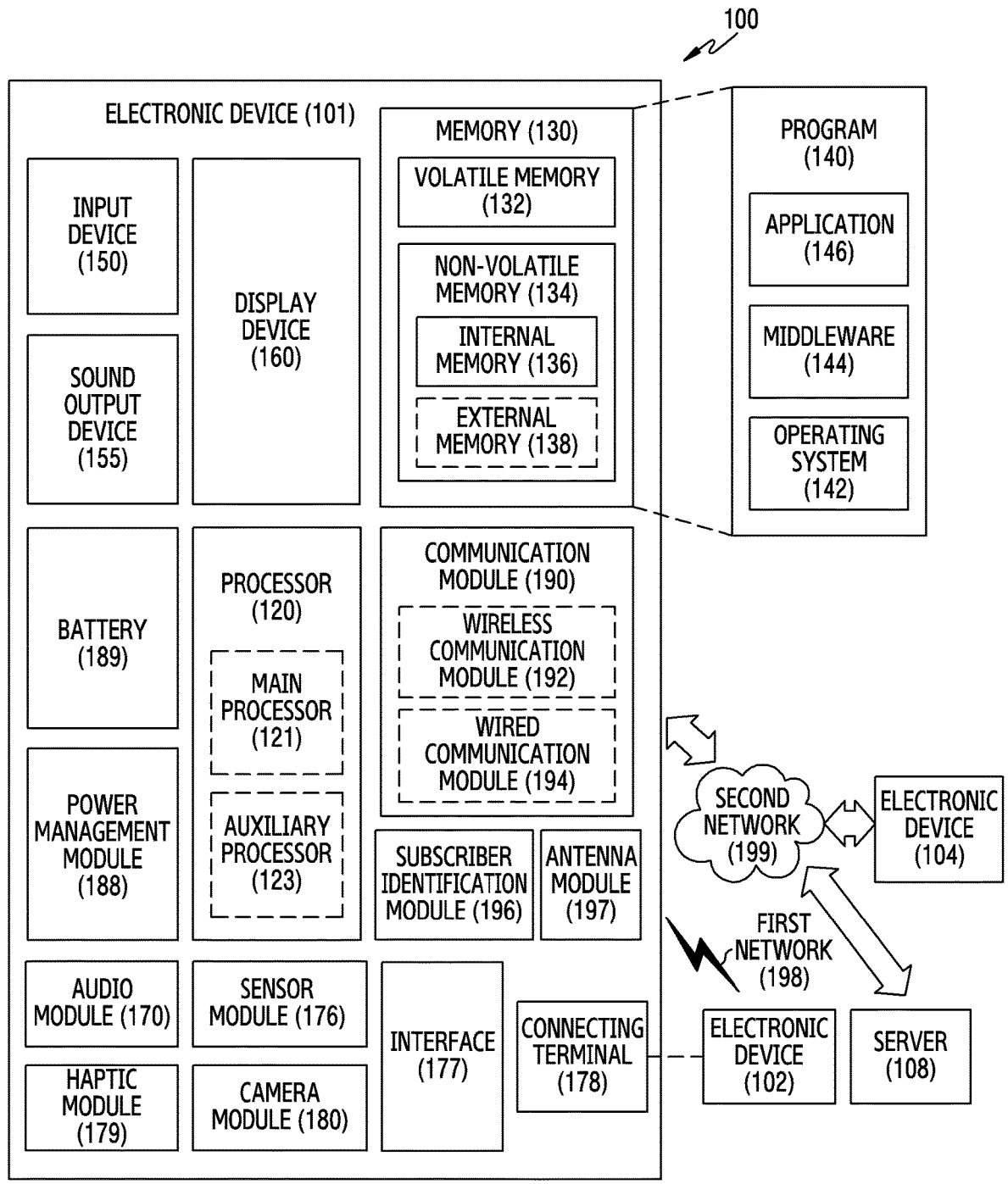
FIG. 1 is a block diagram of an electronic device in a network environment according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas (e.g., at least a first antenna and a second separate antenna). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively, or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

An electronic device may include an antenna for performing communication with another device (e.g., a base station, other electronic devices, etc.). As communication technology has developed, more various frequency bands are used. Accordingly, an antenna of an electronic device may attain higher performance. For example, in order to secure 700 MHz band to 2600 MHz band antenna performance, a large antenna mounting space may be utilized. A method for providing an antenna covering from a 700 MHz band to a 2600 MHz band may be considered, but the method may utilize an excessive mounting space. Therefore, an electronic device 101 according to certain embodiments of the disclosure may include an antenna covering a high-frequency band, in addition to an antenna covering a low-frequency band/mid-frequency band.

Hereinafter, it is described that the range of a frequency band is divided into a low-frequency band (e.g., 1.3 GHz or less), a mid-frequency band (e.g., 1.3 GHz or more and 2.2 GHz or less), and a high-frequency band (e.g., 2.2 GHz or more), but certain embodiments of the disclosure are not limited thereto. High and low of the frequency band may be defined differently depending on the performance of an antenna provided at an electronic device. In addition, in describing a specific frequency band, an uplink (UL) frequency band used when the electronic device 101 transmits a signal through a wireless channel is described as a reference, but certain embodiments of the disclosure may be also applied to a downlink (DL) frequency band.

The electronic device 101 according to certain embodiments of the disclosure may include antennas supporting different frequency bands. In this case, a method for efficiently managing a space for mounting antennas may be utilized to secure other areas (e.g., a bezel area and a black matrix (BM) area) of the electronic device 101. The electronic device 101 according to certain embodiments of the disclosure may propose, instead of two antennas spatially arranged to be spaced apart from each other by a predetermined distance so as to reduce an impact between patterns of two antennas, an antenna coupling technique for securing more spaces and reducing the above-described impact.

Figure 2:
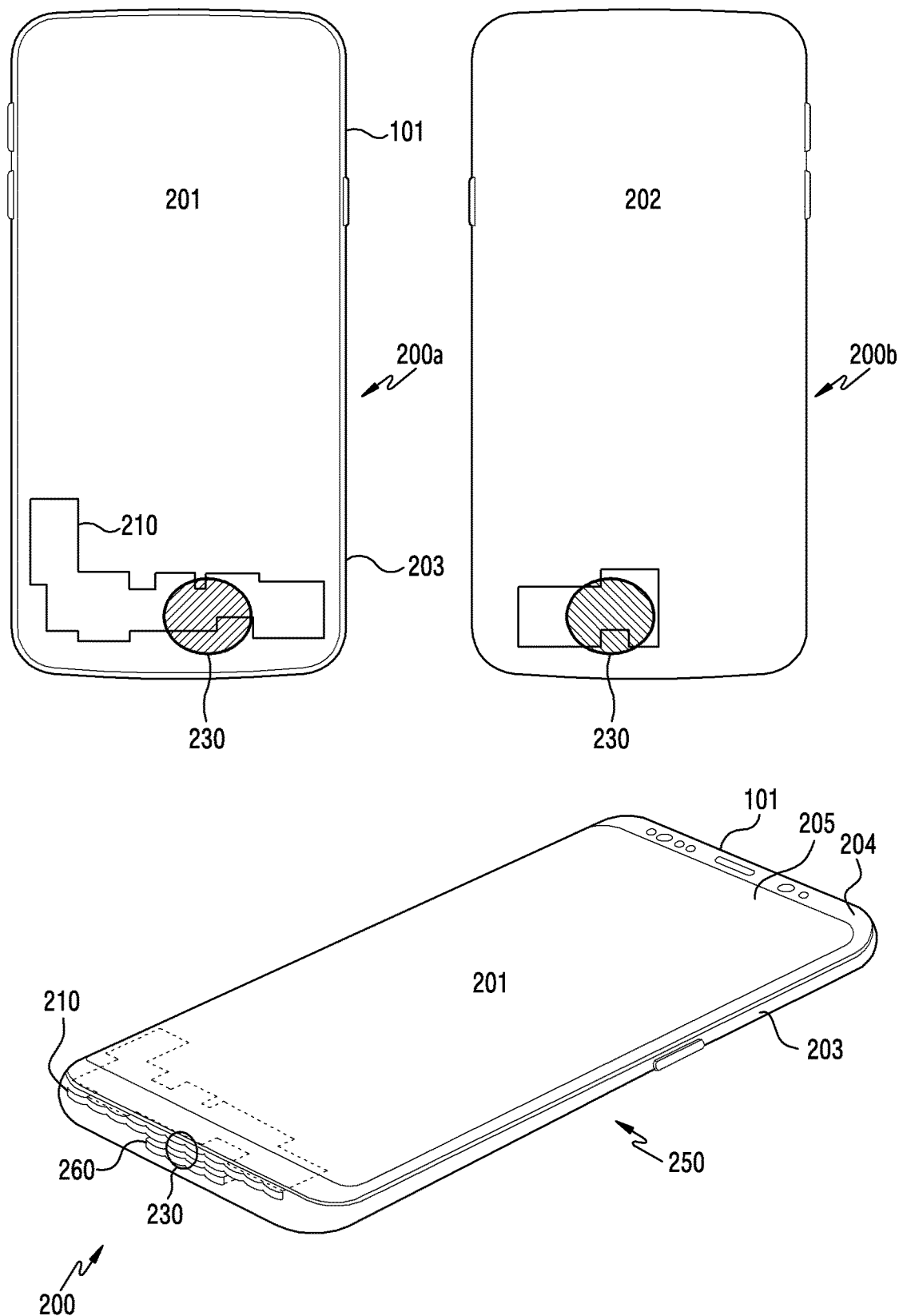
FIG. 2 illustrates an example of deployment of an antenna of an electronic device 101 according to certain embodiments.

FIG. 2 illustrates an example 200 of deployment of an antenna of an electronic device 101 according to certain embodiments.

Referring to FIG. 2, the electronic device 101 may include a first antenna 210 and a second antenna 260. Referring to a front view 200a, a rear view 200b, and a perspective view 250, the electronic device 101 in which the first antenna 210 is disposed may include a housing 204 including a front surface 201, a rear surface 202, and a side surface 203 surrounding a space between the front surface 201 and the rear surface 202, and a display 205 which is disposed in the housing 204 and is exposed through the front surface 201. Referring to the perspective view 250, the second antenna 260 may be disposed under a mounting area of the first antenna 210. According to an embodiment, the second antenna 260 may be disposed on a surface of a printed circuit board (PCB) (not shown) under a mounting space of the first antenna 210. Unlike the illustration in the perspective view 250, the second antenna 260 may alternatively be disposed in the mounting area of the first antenna 210. According to an embodiment, the first antenna 210 may be disposed in the electronic device 101 to surround at least a part of a space of the second antenna 260. When seen from the front surface 201 or the rear surface 202 of the electronic device 101, the first antenna 210 and the second antenna 260 may partially overlap with each other.

According to certain embodiments, the first antenna 210 and the second antenna 260 may be configured to support different frequency bands. The first antenna 210 may be configured to transmit or receive a signal in a frequency band in a first band group. For example, the first band group may include frequency bands of a low-frequency band/mid-frequency band. For example, the first band group may include Band 1 (UL: 1920-1980 MHz, DL: 2110-2170 MHz), Band 3 (UL: 1710-1785 MHz, DL: 1805-1880 MHz), Band 5 (UL: 824-849 MHz, DL: 869-894 MHz), Band 8 (UL: 880-915 MHz, DL: 925-960 MHz), Band 20 (UL: 832-862 MHz, DL: 791-821 MHz), and Band 28 (UL: 703-748 MHz, DL: 758-803 MHz). The second antenna 260 may be configured to transmit or receive a signal in a frequency band in a second band group. For example, the second band group may include frequency bands of a high-frequency band. For example, the second band group may include Band 7 (UL: 2500-2570 MHz, DL: 2620-2690 MHz), Band 38 (UL: 2570-2620 MHz, DL: 2570-2620 MHz), Band 40 (UL: 2300-2400 MHz, DL: 2300-2400 MHz), and Band 41 (UL: 2496-2690 MHz, DL: 2496-2690 MHz).

According to certain embodiments, the electronic device 101 may include a coupling unit 230. "Coupling" in the present disclosure may be defined as a phenomenon in which alternating signal energy is electrically or magnetically transferred between independent spaces or lines. When the first antenna 210 and the second antenna 260 are insufficiently spaced from one another, the first antenna 210 and the second antenna 260 may mutually affect the other due to the coupling phenomenon. Specifically, in the arrangement illustrated in FIG. 2, when the second antenna 260 is disposed adjacent to the mounting area of the first antenna 210, there may be a significant amount of coupling resulting in mutual negative impact to the performance of both antennas 210 and 260. In order to effectively mitigate the negative mutual effect between the two antennas, the electronic device 101 may include the coupling unit 230. The coupling unit 230 may be equipped with a coupling circuit for providing an impedance "Z." The electronic device 101 may control an electrical or magnetic effect between the two antennas (e.g., the first antenna 210 and the second antenna 260) through control of the impedance value Z of the coupling unit 230. Hereinafter, an operation of mitigating the negative mutual effect between the above-described antennas through the control of the impedance value may be referred to as "adaptive antenna coupling."

In order to perform adaptive antenna coupling according to certain embodiments of disclosure, the electronic device 101 may control an impedance value through a band switch for another antenna, without using a separate switch. According to a configuration of the band switch, the impedance of a coupling circuit connected to the band switch may vary. The electronic device 101 according to certain embodiments may provide the improved performance to a frequency band (hereinafter, referred to as a "communication frequency band") for performing communication, according to the impedance of an antenna, which is formed through the coupling circuit. Here, the improved performance may be defined according to a standing wave ratio (SWR), a return loss, and a resonance frequency. For example, the coupling circuit for providing the impedance of the antenna may operate as an impedance matching circuit in the corresponding communication frequency band.

Figure 3:
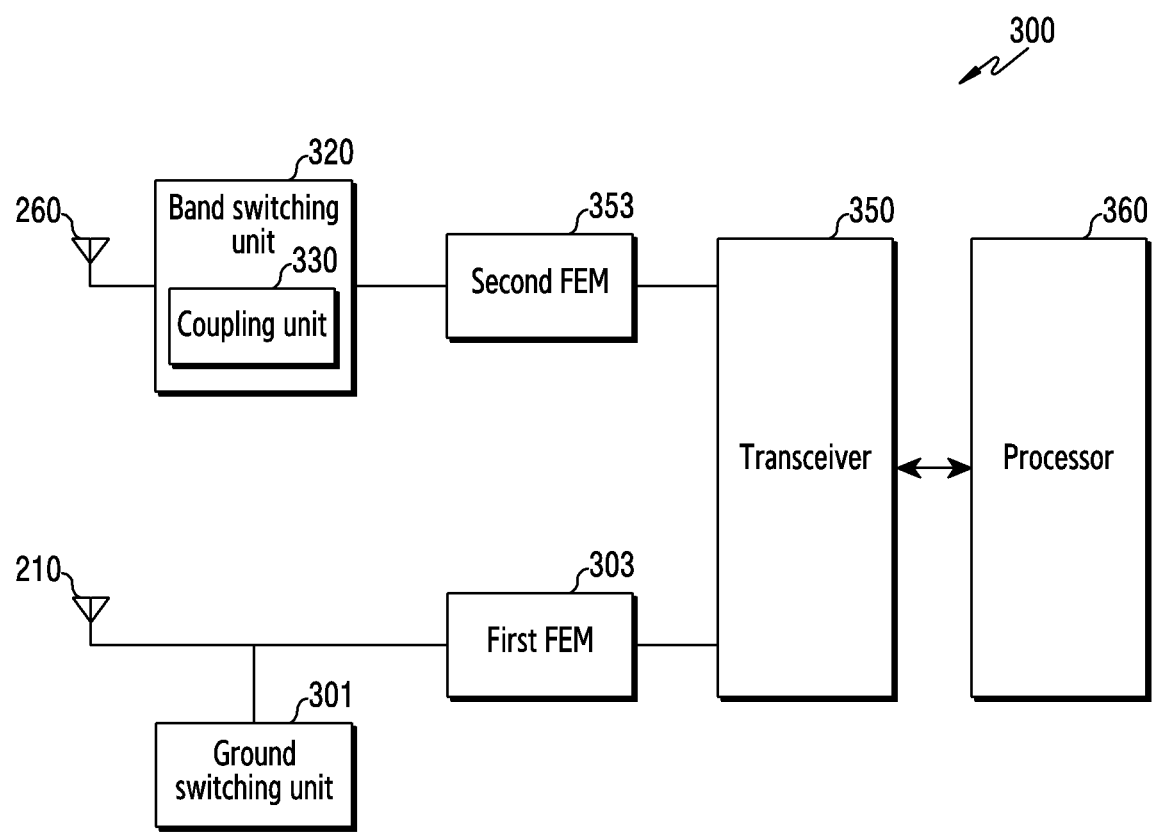
FIG. 3 illustrates an example of a functional configuration of an electronic device according to certain embodiments.

FIG. 3 illustrates an example of a functional configuration 300 of an electronic device 101 according to certain embodiments. The term "unit", "-or/er", or the like, to be used below may indicate a unit for processing at least one function or operation, and may be implemented by hardware, software, or a combination thereof.

Referring to FIG. 3, the electronic device 101 may include a first antenna 210, a ground switching unit 301, a first front-end module (FEM) 303, a second antenna 260, a band switching unit 320, a coupling unit 330, a second FEM 353, a transceiver 350, and a processor 360.

According to certain embodiments, the first antenna 210 and the second antenna 260 may be included in the antenna module 197 of FIG. 1. Each of the first antenna 210 and the second antenna 260 may transmit a signal through the "air," that is, through a wireless channel. In addition, the first antenna 210 and the second antenna 260 may receive a signal through a wireless channel. According to an embodiment, the first antenna 210 may include an antenna for a low-frequency/mid-frequency band. The first antenna 210 may be configured to transmit or receive a signal on the low-frequency/mid-frequency band. Although not shown in FIG. 3, the first antenna 210 may be connected to a ground switching unit 301, a duplexer, or a diplexer for providing a signal of the low-frequency/mid-frequency band. According to an embodiment, the second antenna 260 may include capacity to transmit and receive via the high-frequency band. The second antenna 260 may be configured to transmit or receive a signal on the high-frequency band. The second antenna 260 may be operatively connected to a band switching unit 320 for providing a signal of the high-frequency band.

According to certain embodiments, the ground switching unit 301 may include multiple radio frequency (RF) paths. The ground switching unit 301 may include a ground area. The multiple RF paths may be connected to the ground area. The ground switching unit 301 may connect at least one of the multiple RF paths to an antenna (e.g., the first antenna 210 or the second antenna 260). The at least one RF path may vary according to a communication frequency band. The multiple RF paths may include a path for providing elements that in turn provide the improved antenna performance for each communication frequency band. Here, the antenna performance may include a resonance frequency formed through an antenna and an RF path, a signal gain acquired in the communication frequency band through the antenna, a standing wave ratio acquired through the antenna and the RF path, and a reflection coefficient. According to certain embodiments, the ground switching unit 301 may be in contact with the RF path corresponding to the communication frequency band according to a control of a processor 360 to be described below. According to an embodiment, the ground switching unit 301 may include a single pole four throw (SP4T) switch. The ground switching unit 301 may connect one of four RF paths to the first antenna 210.

According to certain embodiments, the first FEM 303 may transfer a transmission signal to the first antenna 210, or may receive an input of a reception signal through the first antenna 210. The first FEM 303 may include a power amplifier (PA) for amplifying the transmission signal or a low noise amplifier (LNA) for amplifying the reception signal. The first FEM 303 may include a filter (e.g., a diplexer or a duplexer) for classifying frequency bands in the first band group. According to certain embodiments, the second FEM 353 may transfer the transmission signal to the first antenna 210, or receive an input of the reception signal through the first antenna 210. The second FEM 353 may include a PA for amplifying the transmission signal and an LNA for amplifying the reception signal. The second FEM 353 may include a filter (e.g., a diplexer or a duplexer) for classifying frequency bands in the second band group.

According to certain embodiments, the band switching unit 320 may be positioned between the second antenna 260 and the second FEM 353. According to certain embodiments, the band switching unit 320 may select a specific frequency band from among frequency bands in the second band group according to a control of a processor 360 to be described below. The processor 360 may transmit a control signal indicating a band for reception or transmission, to the band switching unit 320. The band switching unit 320 may connect one of the multiple RF paths to the second antenna 260. For example, in order to transmit a signal on one communication frequency band of Band 7, Band 38, Band 40, and Band 41, the band switching unit 320 may connect an RF path corresponding to the communication frequency band to the second antenna 260, among an RF path corresponding to Band 7, an RF path corresponding to Band 38, an RF path corresponding to Band 40, and an RF path corresponding to Band 41. According to an embodiment, the band switching unit 320 may include a single pole four throw (SP4T) switch.

According to certain embodiments, the band switching unit 320 may include a coupling unit 330. The coupling unit 330 may include a coupling circuit configured according to an operation of the band switching unit 320. The coupling circuit may form an impedance of the second antenna 260. An RF path may be determined according to the contact with the band switching unit 320. An impedance value of the second antenna 260 may vary according to the RF value. As the impedance of the second antenna 260 changes, a resonance frequency of the first antenna 210 may change. In other words, the electronic device 101 may determine impedance values for controlling movement of the resonance frequency, and control the band switching unit to select an RF path according to the determined value, thereby improving performance of the first antenna 210. The band switching unit 320 may connect one of the multiple RF paths even though communication is not performed using one of frequency bands in the second band group. According to certain embodiments, the band switching unit 320 may be in contact with one of the multiple RF paths in order to improve performance of the antenna for another band group (i.e., the first band group) even though the communication frequency band does not correspond to the second band group.

According to certain embodiments, the transceiver 350 may transmit or receive a signal through a wireless channel. For example, the transceiver 350 may perform a function of conversion between a baseband signal and a bitstream according to a physical layer standard of the system. For example, for data transmission, the transceiver 350 may generate complex symbols by encoding and modulating a transmission bitstream. In addition, for data reception, the transceiver 350 may restore a reception bitstream by demodulating and decoding a baseband signal. In addition, the transceiver 350 may up-convert a baseband signal into an RF band signal and transmit the RF band signal through an antenna, and may down-convert an RF band signal received through an antenna into a baseband signal. For example, the transceiver 350 may include a transmission filter, a reception filter, an amplifier, a mixer, an oscillator, a digital-to-analog convertor (DAC), an analog-to-digital convertor (ADC), etc. The transceiver may process a signal for processing or transmitting a received signal.

According to certain embodiments, the transceiver 350 may transmit or receive a signal. The transceiver 350 may receive a downlink signal. In addition, the transceiver 350 may transmit an uplink signal. In addition, the transceiver 350 may include different communication modules for processing signals in different frequency bands. Furthermore, the transceiver 350 may include multiple communication modules for supporting multiple different wireless access technologies. For example, the multiple different wireless access technologies may include Bluetooth low energy (BLE), wireless fidelity (Wi-Fi), Wi-Fi gigabyte (WiGig), a cellular network (e.g., long termina evolution (LTE), pre-5G, and new radio (NR)), etc. In addition, the multiple different frequency bands may include a super high frequency (SHF) (e.g., 2.5 GHz or 5 GHZ) band, a millimeter (mm) wave (e.g., 28 GHz, 38 GHz, 60 GHz, etc.) band.

According to certain embodiments, the transceiver 350 may transmit and receive a signal as describe above. Accordingly, all or a part of the transceiver 350 may be referred to as a "transmitter", a "receiver", or a "transmitter/receiver". In addition, the transmission and reception performed through a wireless channel to be described below may be used as a meaning including the above-described processing that is performed by the transceiver 350.

According to certain embodiments, the processor 360 may include the processor 120 of FIG. 1. The processor 360 may determine a communication frequency band and control the band switching unit 320 to transmit or receive a signal according to the determined communication frequency band. The processor 360 may operate the band switching unit 320 to indicate an RF path corresponding to a communication frequency band according to a group to which the communication frequency band belongs. The processor 360 may control the band switching unit 320 to connect the second antenna 260 to a specific RF path, in order to acquire an impedance value corresponding to the communication frequency band. For example, the processor 360 may transmit a control signal to the band switching unit 320.

Although not shown in FIG. 3, the electronic device 101 may further include a memory (e.g., the memory 130 of FIG. 1). The memory may store data such as a basic program for an operation of the electronic device 101, an application program, and configuration information. The memory may include a volatile memory, a non-volatile memory, or a combination of the volatile memory and the non-volatile memory. The memory may provide data stored according to a request from the processor 360. According to certain embodiments, the memory of the electronic device 101 may store mapping information (hereinafter, referred to as ground mapping information) relating to relationships between communication frequency bands and RF paths (or referred to as ground paths) which can be connected to the first antenna 210 through the ground switching unit 301. According to certain embodiments, the memory of electronic device 101 may store mapping information (hereinafter, referred to as coupling mapping information) relating to relationships between communication frequency bands and RF paths (or coupling paths) which can be connected to the second antenna 260 through the band switching unit 320. According to an embodiment, the mapping information may be stored in the CP as non-volatile (NV).

FIG. 3 illustrates an operation of changing the impedance for the second antenna 260 through the band switch in order to increase the performance of the first antenna 210, but the operation of FIG. 3 is a mere example, and the disclosure is not limited thereto. The band switch for the first antenna 210 may be implemented in the electronic device 101, or additional antennas other than the first antenna 210 and the second antenna 260 may be implemented according to certain embodiments, so that the processor 360 may configure a circuit in order to provide the impedance for antenna coupling. In addition, in order to increase the performance of the second antenna 260, the impedance for the first antenna 210 may change.

An electronic device according to certain embodiments may include a first antenna for a first frequency band group, a ground switch coupled to the first antenna, a second antenna for a second frequency band group, in which the second antenna is overlapped with the first antenna, a band selection switch configured to select one of multiple radio frequency (RF) paths for the second frequency band group, and a processor operatively connected to the first antenna, the ground switch, the second antenna, and the band selection switch, in which the processor determines a communication frequency band, identifies an RF path corresponding to the communication frequency band from among the multiple RF paths when the second antenna does not support the communication frequency band, and controls the band selection switch to connect the identified RF path to the second antenna.

According to certain embodiments, the second antenna is a coupling antenna for the first antenna, and the communication frequency band may be included in the first frequency band group.

According to certain embodiments, when the second antenna does not support the communication frequency band, the multiple RF paths may provide different impedances at a time of a connection to the second antenna.

According to certain embodiments, an impedance of the second antenna according to the identified RF path, among impedances according to the multiple RF paths, may provide a highest antenna gain on the communication frequency band.

According to certain embodiments, the ground switch may be additionally configured to connect one of multiple ground paths to the first antenna, and the multiple ground paths may be connected to a ground area of the electronic device.

According to certain embodiments, the ground path among the multiple ground paths may provide a highest antenna gain on the communication frequency band.

According to certain embodiments, the processor may be additionally configured to identify one of the multiple ground paths, and a combination of the identified one ground path and the identified RF path corresponds to a combination which provides a highest antenna gain, among respective combinations of the multiple ground paths and the ground paths on the communication frequency band.

According to certain embodiments, the processor may be additionally configured to control the ground switch by using ground path information indicating a ground path corresponding to each of communication frequency bands and to control the band selection switch by using coupling path information indicating an RF path corresponding to each of frequency bands in the first frequency band group According to certain embodiments, the processor may be additionally configured to store values of the ground path information and values of the coupling path information as non-volatile (NV), and the processor may include a communication processor (CP).

According to certain embodiments, the electronic device may further include: a first front-end module (FEM) which is connected between the first antenna and the processor and is configured to process a signal for the first antenna; and a second FEM which is connected between the second antenna and the processor and is configured to process a signal for the second antenna.

FIGS. 2 and 3 describe a functional configuration of each of the electronic device 101 and the first antenna 210 and the second antenna 260 arranged in the electronic device 101. Hereinafter, an operation of a processor for performing antenna coupling according to a communication frequency band will be described in FIG. 4.

Figure 4:
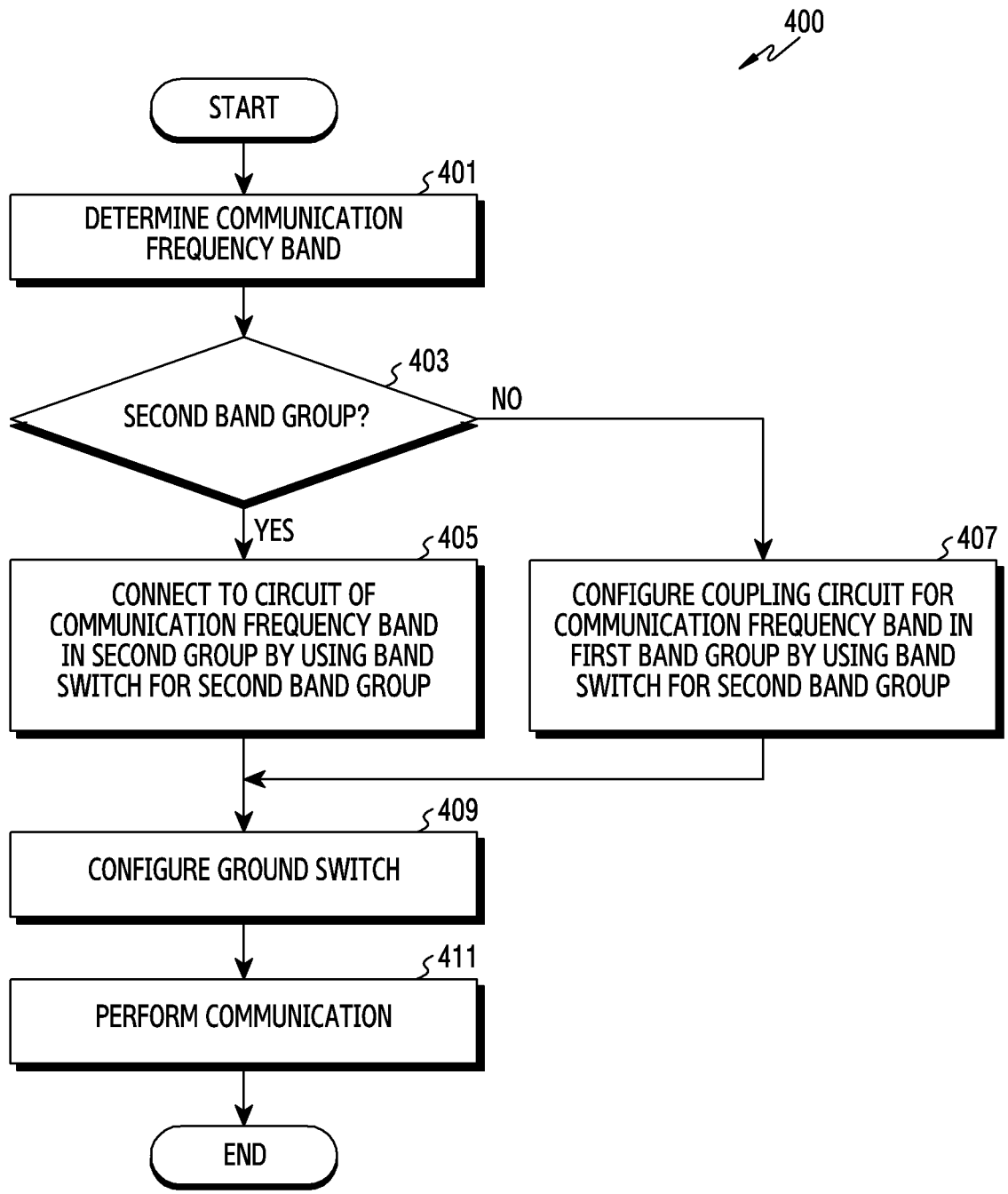
FIG. 4 is a flow chart of an electronic device for adaptive antenna coupling according to certain embodiments.

FIG. 4 is a flow chart 400 of an electronic device 101 for adaptive antenna coupling according to certain embodiments. Operations to be described below may be performed by the processor 120 of the electronic device 101 illustrated in FIG. 1, or the processor 360 of the electronic device 101 illustrated in the functional configuration 300 of FIG. 3.

Referring to FIG. 4, in operation 401, the processor 120 may determine a communication frequency band. The communication frequency band may refer to a frequency area on a wireless channel through which a wireless signal is transmitted or received. A frequency band capable of communication may be determined according to the performance of hardware (e.g., a filter, a duplexer, and a switch) provided at the electronic device 101. The processor 120 may determine a frequency band for transmitting or receiving a signal.

According to certain embodiments, in operation 403, the processor 120 may determine whether the communication frequency band corresponds to a second band group. The second band group may correspond to a group for providing a frequency band in a frequency area that is different from that of a first band group to be described below. For example, the second band group may correspond to a group including high-frequency bands. When the communication frequency band corresponds to the second band group, the processor 120 may perform operation 405. When the communication frequency band does not correspond to the second band group, the processor 120 may perform operation 407.

According to certain embodiments, in operation 405, when the determined communication frequency band corresponds to the second band group, then the processor 120 may control an antenna (e.g., the second antenna 260 of FIG. 2, hereinafter, referred to as a second antenna) to be operatively connected to a circuit in the communication frequency band in the second band group by using a band switch for the second band group. The processor 120 may determine that the communication frequency band determined in operation 401 corresponds to a frequency band in the second band group. The processor 120 may connect an antenna to an RF path corresponding to the corresponding frequency band through the second antenna so as to transmit a signal on the communication frequency band.

According to certain embodiments, in operation 407, when the determined communication frequency band does not correspond to the second band group, the processor 120 may configure a coupling circuit for a communication frequency band in the first band group by using the band switch for the second group. For example, the processor 120 may determine that the communication frequency band determined in operation 401 corresponds to a frequency band in the first band group which is disparate from the second band group. For example, the first band group may correspond to a group including low-frequency bands/mid-frequency bands. The processor 120 may configure a coupling circuit to transmit or receive a signal on the communication frequency band in the first band group. The processor 120 may configure the coupling circuit to optimize the performance of an antenna (e.g., the first antenna 210 of FIG. 2, hereinafter, referred to as a first antenna) for the first band group. For example, the processor 120 may configure the coupling circuit to have an impedance, among multiple impedances, which achieves the highest gain, among multiple gains, for a signal transmitted through the antenna for the first band group. In addition, in another example, the processor 120 may configure the coupling circuit to have an impedance which locates the resonance frequency of the communication band within a predetermined error range, among multiple impedances. Here, the configuration of the coupling circuit may mean controlling of an impedance value of the coupling circuit by selecting an RF path which is indicated by the band switch.

According to certain embodiments, in operation 409, the processor 120 may configure a ground switch. The processor 120 may configure the ground switch to optimize the performance of an antenna according to the communication frequency band. When the communication frequency band corresponds to the first band group, the processor 120 may configure the ground switch to select a ground path appropriate for the first antenna. The ground path appropriate for the first antenna may mean a path determined according to a performance index (e.g., a standing wave ratio, a voltage standing wave ratio, a reflection coeffect, a return loss, and a signal gain) for the first antenna, among multiple paths selectable by the ground switch. Similarly, when the communication frequency band corresponds to the second band group, the processor 120 may configure the ground switch to select a ground path appropriate for the second antenna.

According to certain embodiments, in operation 411, the processor 120 may perform communication. The processor 120 may determine an RF path from the processor 120 to the antenna by performing operations 401 to 409, and accordingly, may transmit or receive a signal.

In FIG. 4, certain embodiments illustrate, as an example, two band groups and an antenna corresponding to each of the band groups, but the disclosure is not limited thereto. According to certain embodiments, all frequency bands may be divided into three band groups including high-frequency bands, mid-frequency bands, and low-frequency bands, rather than two band groups. In addition, the electronic device 101 may include three antennas corresponding to bands, respectively. When a signal is to be transmitted through an antenna, the electronic device 101 may select a specific path so as to have an impedance appropriate for antenna coupling, among paths which can be selected by respective switches of the other two antennas. In addition, instead of performing antenna coupling at the time of occurrence of a specific event, the electronic device 101 may configure a circuit to be connected to a port having a terminating resistor (e.g., 50 ohm). An operation of connecting to the existing terminating resistor without performing the antenna coupling may also be understood as an embodiment of the disclosure.

Operations of FIG. 4 are illustrated as an example in which the second frequency band corresponds to a high-frequency band, but certain embodiments of the disclosure may be also applicable to a case in which the second frequency band corresponds to a low-frequency band/mid-frequency band.

Figure 5:
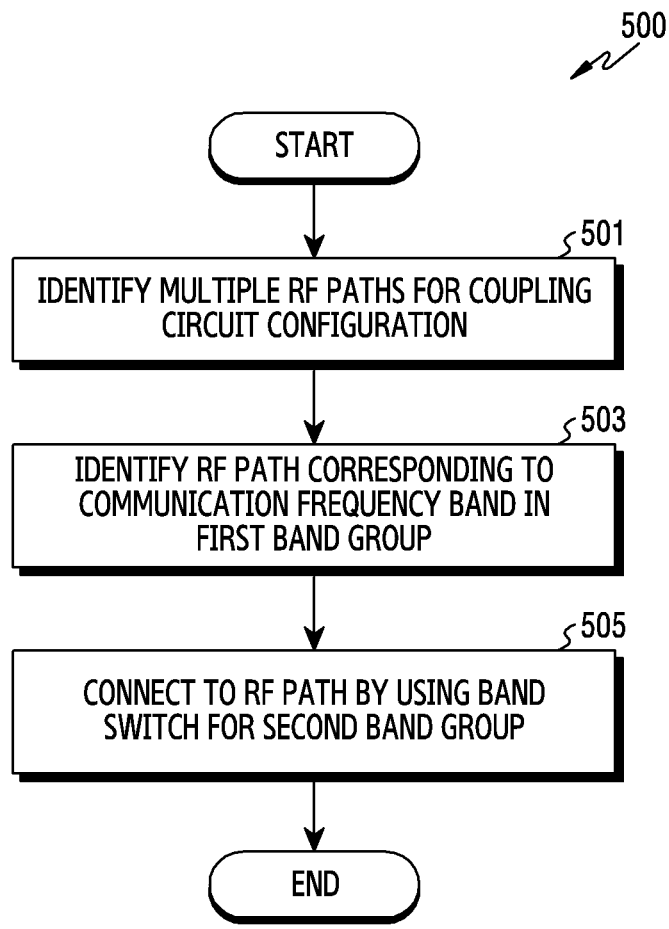
FIG. 5 is a flow chart of an electronic device for coupling circuit configuration according to certain embodiments.

FIG. 5 is a flow chart 500 of an electronic device 101 for coupling circuit configuration according to certain embodiments. Operations to be described below may be performed by the processor 120 of the electronic device 101 illustrated in FIG. 1 or the processor 360 of the electronic device 101 illustrated in the functional configuration 300 of FIG. 3. FIG. 5 illustrates a part of operation 407 in FIG. 4, and it may be understood that the operation flow 500 of FIG. 5 corresponds an operation of the processor 120. A case in which an antenna for a communication frequency band is different from an antenna (hereinafter, a coupling antenna) connected to a coupling circuit is described.

Referring to FIG. 5, in operation 501, the processor 120 may identify multiple RF paths for coupling circuit configuration. The processor 120 may determine a coupling antenna rather than an antenna of a communication frequency band. Here, the coupling antenna may indicate an antenna that is not used for communication while a signal in the communication frequency band is transmitted or received. The processor 120 may identify multiple RF paths of a circuit (e.g., the band switching unit 320 of FIG. 3) connected to the coupling antenna. When the coupling antenna is used for communication, each of the multiple RF paths may correspond to a path for providing a specific frequency band among band groups for the coupling antenna. Each of the RF paths may be referred to as a coupling path.

According to certain embodiments, in operation 503, the processor 120 may identify an RF path corresponding to a communication frequency band in a first band group. For example, according to operation 403 in FIG. 4, the processor 120 may detect that the communication frequency band belongs to the first band group. The processor 120 may detect that no antenna for a second band group is used. The processor 120 may identify an RF path corresponding to the communication frequency band, from among RF paths in operation 501. Here, the RF paths may be paths included in a band switch (e.g., the band switching unit 320 of FIG. 3) for the second band group. The processor 120 may identify an RF path for providing gain improvement of the communication frequency band, through a band switch for an unused antenna. Here, the unused antenna may refer to an antenna which is not used to transmit or receive a signal for current wireless communication. According to examples in tables 1 to 4, a scheme for identifying an RF path corresponding to a communication frequency band is described.

Table 1 shows a signal gain for a default state. The default state may reduce an impact due to an unused antenna by operatively connecting an antenna to a terminating resistor, instead of connecting the antenna to an RF path through a band switch.

TABLE 1

| Switch type | | Low-frequency band | | | | Mid-frequency band | |
| --- | --- | --- | --- | --- | --- | --- | --- |
| Band switch | Ground switch | B28 M(725.5) | B20 M(847) | B5 M(836.5) | B8 M(897.5) | B3 M(1747.5) | B1 M(1950) |
| Terminating resistor (50 ohm) | RF1 | 13.37 | 14.55 | 15.76 | 14.93 | 14.58 | 18.98 |
| | RF2 | 10.24 | 15.96 | 16.83 | 16.52 | 12.16 | 19.85 |
| | RF3 | 7.68 | 15.15 | 15.77 | 16.96 | 12.63 | 14.53 |
| | RF4 | 5.51 | 13.76 | 14.29 | 16.69 | 13.93 | 15 |

The ground switch may be configured to operatively connect a first antenna (e.g., a low-frequency band/mid-frequency band antenna) to a first RF path when the communication frequency band corresponds to Band 28 or Band 3, to a second RF band when the communication frequency band corresponds to Band 20, Band 5, or Band 1, and to a third RF path when the communication frequency band corresponds to Band 8.

Tables 2 to 4 show a signal gain in a case in which the band switch is in a coupling state. The coupling state may indicate a state in which an antenna of the band switch is not used for wireless signal transmission or reception, and is thus operating as a coupling antenna. Table 2 shows a signal gain in a state in which the band switch connects the first RF path to the coupling antenna, Table 3 shows a signal gain in a state in which the band switch connects the second RF path to the coupling antenna, and Table 4 shows a signal gain in a state in which the band switch connects the third RF path to the coupling antenna.

TABLE 2

| Switch type | | Low-frequency band | | | | Mid-frequency band | |
| --- | --- | --- | --- | --- | --- | --- | --- |
| Band switch | Ground switch | B28 M(725.5) | B20 M(847) | B5 M(836.5) | B8 M(897.5) | B3 M(1747.5) | B1 M(1950) |
| RF1 | RF1 | 10.52 | 14.89 | 15.57 | 15.19 | 18.41 | 14.92 |
|  | RF2 | 8.46 | 16.73 | 16.95 | 16.91 | 19.58 | 14.92 |
|  | RF3 | 6.57 | 16.23 | 16.1 | 17.56 | 16.41 | 13.3 |
|  | RF4 | 4.84 | 15.13 | 14.93 | 17.64 | 16.26 | 13.62 |

Referring to Table 2, it may be identified that, in Band 3, an effective improvement of about 5 dB is achieved, compared to the default state. When the communication frequency band corresponds to Band 3 or Band 8, the band switch may be set into contact with the first RF path so as to provide the highest signal gain. The processor 120 may identify the first RF path as a coupling path of the band switch corresponding to Band 3 or Band 8.

TABLE 3

| Switch type | | Low-frequency band | | | | Mid-frequency band | |
| --- | --- | --- | --- | --- | --- | --- | --- |
| Band Switch | Ground switch | B28 M(725.5) | B20 M(847) | B5 M(836.5) | B8 M(897.5) | B3 M(1747.5) | B1 M(1950) |
| RF2 | RF1 | 14.73 | 11.16 | 12.56 | 7.82 | 17.44 | 11.01 |
|  | RF2 | 13.09 | 13.3 | 15.09 | 7.91 | 19.86 | 10.36 |
|  | RF3 | 9.63 | 14.23 | 16.21 | 7.54 | 15.94 | 9.84 |
|  | RF4 | 7.09 | 14.97 | 16.89 | 7.24 | 15.51 | 13.16 |

Referring to Table 3, it may be identified that, in Band 28, an improvement of about 1.5 dB is achieved, compared to the default state. When the communication frequency band corresponds to Band 28, the band switch may be set in contact with the second RF path to provide the highest signal gain. The processor 120 may identify the second RF path as a coupling path of the band switch corresponding to Band 28.

TABLE 4

| Switch type | | Low-frequency band | | | | Mid-frequency band | |
| --- | --- | --- | --- | --- | --- | --- | --- |
| Band switch | Ground switch | B28 M(725.5) | B20 M(847) | B5 M(836.5) | B8 M(897.5) | B3 M(1747.5) | B1 M(1950) |
| RF3 | RF1 | 10.83 | 16.03 | 16.51 | 16.37 | 9.07 | 19.6 |
|  | RF2 | 9.43 | 16.85 | 17.55 | 16.92 | 4.99 | 19.65 |

TABLE 4-continued

| Switch type | | Low-frequency band | | | | Mid-frequency band | |
| --- | --- | --- | --- | --- | --- | --- | --- |
| Band switch | Ground switch | B28 M(725.5) | B20 M(847) | B5 M(836.5) | B8 M(897.5) | B3 M(1747.5) | B1 M(1950) |
| | RF3 | 7.22 | 16.17 | 16.26 | 17.53 | 8.05 | 14.39 |
| | RF4 | 5.46 | 15.19 | 15.03 | 17.62 | 9.57 | 16.06 |

Referring to Table 4, it is identified that, in Band 20 and Band 50, an improvement of about 1 dB is achieved, and in Band 1, an effect of improvement of about 0.5 dB is achieved, compared to the default state. When the communication frequency band corresponds to Band 20, Band 5, or Band 1, the band switch may be set in contact with the third RF path to provide the highest signal gain. The processor 120 may identify the third RF path as a coupling path of the band switch corresponding to Band 20, Band 5, or Band 1.

As described above in Tables 2 to 4, the processor 120 may identify, as a coupling path for the communication frequency band, an RF path which provides the highest signal gain from among all available RF paths for an unused antenna. When the communication frequency band corresponds to a low-frequency band, the processor 120 may perform coupling by using a high-frequency band antenna. The processor 120 may change the impedance of the high-frequency band antenna by changing the band switch, so as to provide an effect of performance improvement of maximum 5 dB or more, compared to a case in which a single antenna in the low-frequency band/mid-frequency band is configured.

Although a signal gain is described as an example, adaptive antenna coupling according to certain embodiments of the disclosure is not limited thereto. According to certain embodiments, the processor 120 may identify an RF path by using other indices indicating the performance of an antenna. For example, the processor 120 may identify, as a coupling path, an RF path for forming resonance that is close to the actual communication frequency band. In addition, in another example, the processor 120 may identify, as a coupling path, an RF path for forming an impedance having the lowest reflection coefficient.

According to certain embodiments, in operation 505, the processor 120 may connect the antenna to the identified RF path by using the band switch for the second band group. The antenna may correspond to a coupling antenna. The processor 120 may transmit a control signal to the band switch so that the band switch is to be in contact with the identified RF path. As the RF path is connected to the coupling antenna, the impedance of the coupling antenna may provide improvement in the performance of an antenna in the communication frequency band. For example, as the impedance of the coupling antenna is configured, a resonance frequency which is closer to the communication frequency band may be formed, compared to a case in which a terminating resistor is connected. In another example, as the impedance of the coupling antenna is configured, a signal gain may increase compared to a case in which a terminating resistor is connected.

As described in FIGS. 2 and 3, according to certain embodiments, without adding a space in addition to a first antenna supporting a first frequency band (e.g., a low-frequency/mid-frequency band), a second antenna supporting a second frequency band (e.g., a high-frequency band) may be disposed in an area overlapping the first antenna, whereby a requisite antenna mounting space can be reduced.

As described in FIGS. 4 and 5, through the antenna coupling, the electronic device 101 may not only maximize efficiency of each antenna but also adaptively configure the impedance according to the communication frequency band, thereby effectively controlling an impact between two antennas. Instead of connecting the terminating resistor for reducing the effect of the unused antenna, the electronic device 101 perform antenna coupling by forming the impedance of the unused antenna, so that an RF path of a band switch, which provides the highest performance (e.g., the lowest reflection coefficient, the lowest resonance error, or the highest signal gain) in the current communication frequency band, is selected.

Figure 6:
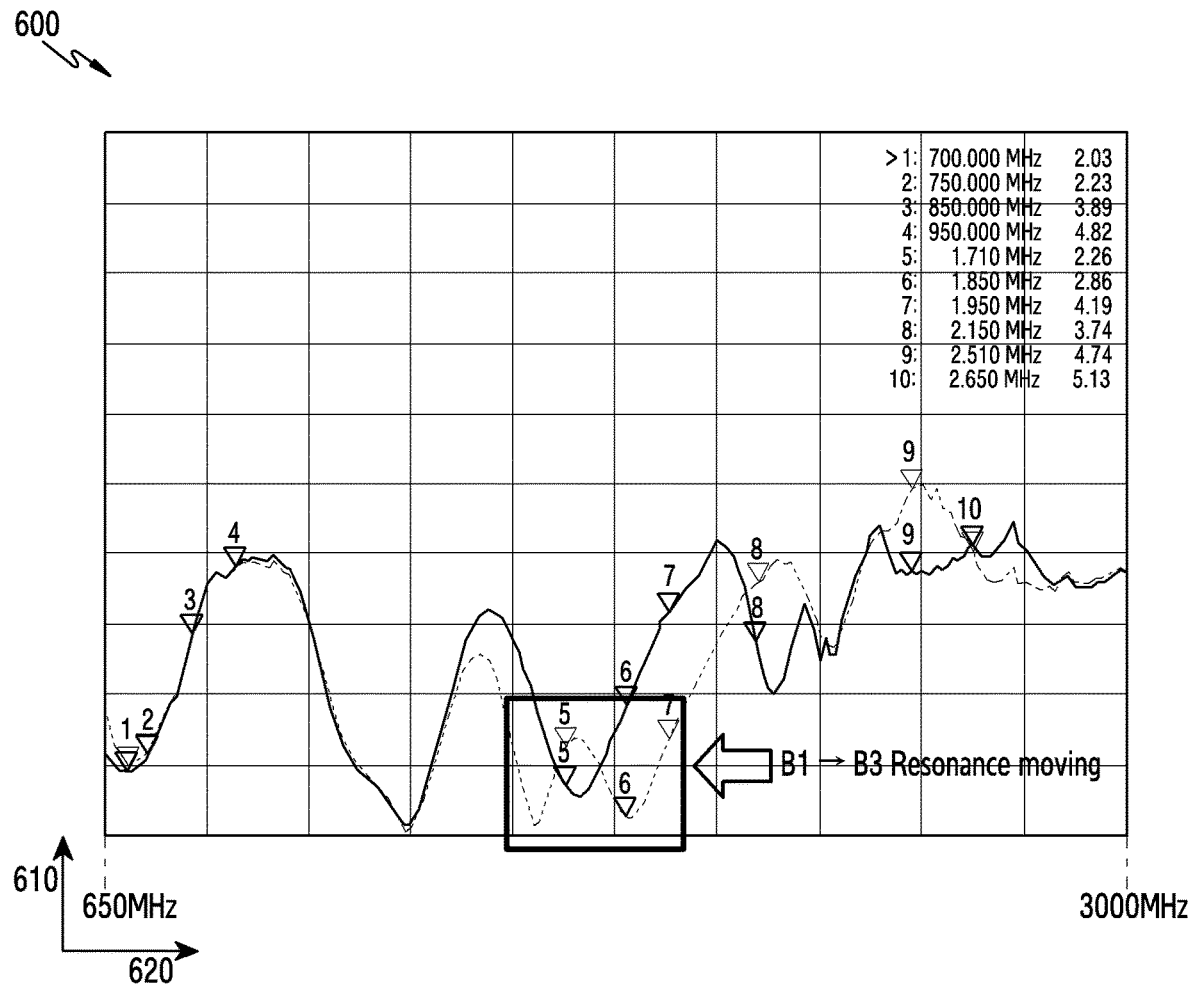
FIG. 6 is a graph illustrating resonance moving according to antenna coupling according to certain embodiments.

FIG. 6 is a graph 600 illustrating resonance moving according to antenna coupling according to certain embodiments.

Referring to FIG. 6, a vertical axis 610 of the graph 600 indicates a voltage SWR (VSWR), and a horizontal axis 620 indicates a frequency (unit: MHz). The VSWR refers to a ratio of the maximum amplitude to the minimum amplitude of a voltage standing wave generated by a sum of a voltage wave traveling toward a load and a reflected voltage wave, and may indicate the degree of impedance matching. A frequency range in which a VSWR has a value smaller than a predetermined value (e.g., 2) may indicate a bandwidth.

A dotted line in the graph 600 may correspond to a case occurring prior to changing an impedance, and a solid line in the graph 600 may corresponds to a case occurring after changing the impedance. In the upper right corner of the graph 600, a first value to a fifth value may correspond to the dotted line, and a sixth value to a tenth value may correspond to the solid line. Referring to a part illustrated in the dotted line, point 6 shows that the VSWR has a value equal to or smaller than a predetermined value (e.g., 2). Referring to a part illustrated in the solid line, point 5 shows that the VSWR has a value equal to or smaller than a predetermined value (e.g., 2). In other words, due to the change in the impedance, there is movement in a frequency in which resonance is formed. In the VSWR having a value smaller than a threshold value (or a reflection coefficient equal to or greater than a threshold value), forming the resonance within a predetermined range in a specific frequency area may result in an increase to antenna gain in the specific frequency area. For example, according to the change in the impedance, the communication frequency band for providing the improved antenna gain may move from B1 to B3.

According to certain embodiments, in order to achieve optimization through coupling between a high-frequency band antenna and a low-frequency/mid-frequency band antenna, the electronic device 101 may change the impedance of the high-frequency band antenna when communication is performed in the low-frequency/mid-frequency band, thereby increasing resonance efficiency with the low-frequency/mid-frequency band antenna.

According to certain embodiments of the disclosure, antennas for providing different frequency bands overlap with each other and are mounted, and coupling between the antennas is performed through impedance controlling, whereby the antenna performance can be maximized. In addition, a coupling circuit is configured by using a band switch (e.g., the band switching unit 320) at a conduction end of an originally provided antenna (e.g., the second antenna 260), whereby problems (e.g., deterioration in the antenna performance) caused by a narrow mounting area can be solved without an additional increase in cost.

According to certain embodiments, a method of an electronic device including a first antenna for a first frequency band group, a ground switch coupled to the first antenna, and a second antenna for a second frequency band group, may include determining a communication frequency band, identifying an RF path corresponding to the communication frequency band from among multiple radio frequency (RF) paths for the second frequency band group when the second antenna does not support the communication frequency band, and controlling a band selection switch to connect the identified RF path to the second antenna.

According to certain embodiments, the second antenna is a coupling antenna for the first antenna, and the communication frequency band may be included in the first frequency band group.

According to certain embodiments, when the second antenna does not support the communication frequency band, the multiple RF paths may provide different impedances at a time of a connection to the second antenna.

According to certain embodiments, an impedance of the second antenna according to the identified RF path, among impedances according to the multiple RF paths, may provide a highest antenna gain on the communication frequency band.

According to certain embodiments, the method may further include connecting one of multiple ground paths to the first antenna by using the ground switch, in which the multiple ground paths are connected to a ground area of the electronic device.

According to certain embodiments, the ground path among the multiple ground paths may provide a highest antenna gain on the communication frequency band.

According to certain embodiments, the method may further include identifying one of the multiple ground paths, in which a combination of the identified one ground path and the identified RF path corresponds to a combination which provides a highest antenna gain, among respective combinations of the multiple ground paths and the ground paths on the communication frequency band.

According to certain embodiments, the ground switch may be controlled by using ground path information indicating a ground path corresponding to each of communication frequency bands, and the band selection switch may be controlled by using coupling path information indicating an RF path corresponding to each of frequency bands in the first frequency band group.

According to certain embodiments, the method may further include storing, in a processor, values of the ground path information and values of the coupling path information as non-volatile (NV), in which the processor includes a communication processor (CP).

According to certain embodiments, the method may further include processing a signal for the first antenna by using a first front-end module (FEM) connected between the first antenna and the processor, and processing a signal for the second antenna by using a second FEM connected between the second antenna and the processor.

A band switch (e.g., the band switch 320 of FIG. 3) according to certain embodiments of the disclosure may be implemented as NV so that the switch can connect an antenna to a specific path by operating even during communication using an antenna other than an antenna connected to the band switch, instead of performing an automatic connection when the corresponding band is connected. Like a ground switch (e.g., the ground switching unit 301 of FIG. 3), the band switch may be implemented as NV, so that an RF signal may pass through the improved RF circuit for the communication frequency band and may be transmitted or received to or from a wireless channel.

In the disclosure, to determine whether a specific condition is fulfilled, the expression of "equal to or more than" or "equal to or less than" has been used, but this is merely an example, and does not exclude a statement of "exceeding" or "less than". A condition stated as "equal to or more than" may be replaced with "exceeding", and a condition stated as "equal to or less than" may be replaced with "less than", and a condition stated as "equal to or more than and less than" may be replaced with "exceeding and equal to or less than".

Methods disclosed in the claims and/or methods according to certain embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to certain embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the disclosure. Therefore, the disclosure should not be defined as being limited to the embodiments, but should be defined by the appended claims and equivalents thereof

What is claimed is:

1. An electronic device, comprising:
   a first antenna configured to communicate using a first frequency band group;
   a ground switch coupled to the first antenna;
   a second antenna configured to communicate using a second frequency band group, wherein the second antenna overlaps the first antenna;
   a band selection switch configured to select one of multiple radio frequency (RF) paths for the second frequency band group; and
   a processor operatively connected to the first antenna, the ground switch, the second antenna, and the band selection switch, wherein the processor is configured to:
   determine a communication frequency band,
   when the communication frequency band is unsupported by the second antenna, identify an RF path corresponding to the communication frequency band from among the multiple RF paths, and
   control the band selection switch to select the identified RF path for operative connection to the second antenna.

2. The electronic device of claim 1, wherein the second antenna is a coupling antenna for the first antenna, and
   wherein the communication frequency band is included in the first frequency band group.

3. The electronic device of claim 1, wherein when the communication frequency band is unsupported by the second antenna, the multiple RF paths provide different impedances at a time in which the operative connection to the second antenna is established.

4. The electronic device of claim 1, wherein the selected RF path that is identified from among the multiple RF paths corresponds to an impedance that provides a highest antenna gain on the communication frequency band.

5. The electronic device of claim 1, wherein the processor is further configured to identify a first ground path from among multiple ground paths, and
   control the ground switch to operatively connected the identified first ground path to the first antenna,
   wherein the multiple ground paths are operatively connected to a ground area of the electronic device.

6. The electronic device of claim 5, wherein the first ground path is identified from among the multiple ground paths based on provision of a highest antenna gain on the communication frequency band.

7. The electronic device of claim 5,
   wherein a combination of the identified first ground path and the identified RF path provides a highest antenna gain from among all potential combinations of the multiple ground paths and the RF paths on the communication frequency band.

8. The electronic device of claim 6, wherein the processor is additionally configured to:
   control the ground switch using ground path information indicating associations between each of the multiple ground paths with each of a plurality of communication frequency bands, and
   control the band selection switch using coupling path information indicating associations between each of the multiple RF paths with each of the frequency bands in the first frequency band group.

9. The electronic device of claim 8, wherein the processor is configured to store values of the ground path information and values of the coupling path information as non-volatile (NV) in a memory associated with a communication processor (CP).

10. The electronic device of claim 1, further comprising:
    a first front-end module (FEM) which is operatively connecting the first antenna and the processor, the first FEM configured to process signals for the first antenna; and
    a second FEM operatively connect the second antenna and the processor, the second FEM configured to process signals for the second antenna.

11. A method of an electronic device comprising a first antenna for a first frequency band group, a ground switch coupled to the first antenna, and a second antenna for a second frequency band group, the method comprising:
    determining, by at least one processor, a communication frequency band,
    when the determined communication frequency band is unsupported by the second antenna, identifying a radio frequency (RF) path corresponding to the determined communication frequency band from among multiple radio frequency (RF) paths for the second frequency band group, and
    controlling a band selection switch to select the identified RF path for operative connection to the second antenna,
    wherein the second antenna is a coupling antenna for the first antenna.

12. The method of claim 11,
    wherein the communication frequency band is included in the first frequency band group.

13. The method of claim 11, wherein when the determined communication frequency band in unsupported by the second antenna, the multiple RF paths provide different impedances at a time in which the operative connection to the second antenna is established.

14. The method of claim 11, wherein the selected RF path that is identified from among the multiple RF paths corresponds to an impedance that provides a highest antenna gain on the communication frequency band.

15. The method of claim 11, further comprising:
    identifying a first ground path from among multiple ground paths; and
    controlling the ground switch to operative connect the identified first ground path to the first antenna,
    wherein the multiple ground paths are operatively connected to a ground area of the electronic device.

16. The method of claim 15, wherein the first ground path is identified from among the multiple ground paths based on provision of a highest antenna gain on the communication frequency band.

17. The method of claim 15,
    wherein a combination of the identified first ground path and the identified RF path provides a highest antenna gain from among all potential combinations of the multiple ground paths and the RF paths on the communication frequency band.

18. The method of claim 11, wherein the ground switch is controlled using ground path information indicating associations between each of multiple ground paths with each of a plurality of communication frequency bands, and
    wherein the band selection switch is controlled using coupling path information associations between each of the multiple RF paths with each of the frequency bands in the first frequency band group.

19. The method of claim 18, further comprising storing values of the ground path information and values of the coupling path information as non-volatile (NV) in a memory associated with a communication processor (CP).

20. The method of claim 11, further comprising:
processing a signal for the first antenna using a first front-end module (FEM) operatively connecting the first antenna and the at least one processor, and
processing a signal for the second antenna using a second FEM operatively connecting the second antenna and the at least one processor.

\* \* \* \* \*